United States Patent [19]
Chevallier et al.

[11] Patent Number: 5,882,617
[45] Date of Patent: *Mar. 16, 1999

[54] PRECIPITATED SILICAS

[75] Inventors: Yvonick Chevallier, Fontains-Saint; Evelyne Prat, Pantin, both of France

[73] Assignee: Rhone-Poulenc Chimie, Courbevoie Cedex, France

[*] Notice: This patent issued on a continued prosecution application filed under 37 CFR 1.53(d), and is subject to the twenty year patent term provisions of 35 U.S.C. 154(a)(2).

The term of this patent shall not extend beyond the expiration date of Pat. No. 5,403,570.

[21] Appl. No.: 886,146

[22] Filed: Jun. 30, 1997

Related U.S. Application Data

[63] Continuation of Ser. No. 446,796, filed as PCT/FR94/01144 Sep. 29, 1994, abandoned.

[30] Foreign Application Priority Data

Sep. 29, 1993 [FR] France .................................. 93 11554

[51] Int. Cl.$^6$ .................................................. C01B 33/12
[52] U.S. Cl. .............................................................. 423/339
[58] Field of Search ...................................... 423/335, 339

[56] References Cited

U.S. PATENT DOCUMENTS

| | | | |
|---|---|---|---|
| 2,731,326 | 1/1956 | Alexander et al. | 23/182 |
| 3,024,199 | 3/1962 | Pasfield | 252/313 |
| 3,383,172 | 5/1968 | Biegler et al. | 23/182 |
| 3,699,624 | 6/1972 | Warthen et al. | 23/182 R |
| 3,794,712 | 2/1974 | Aboutboul et al. | 423/338 |
| 3,800,031 | 3/1974 | Sale et al. | 423/338 |
| 3,803,046 | 4/1974 | Winyall et al. | 252/317 |
| 3,860,682 | 1/1975 | Reinhardt et al. | 264/91 |
| 3,923,533 | 12/1975 | Hammel et al. | 106/54 |
| 3,954,944 | 5/1976 | Aldcroft et al. | 423/335 |
| 3,963,512 | 6/1976 | Swift et al. | 106/308 M |
| 4,049,781 | 9/1977 | Acker et al. | 423/338 |
| 4,067,746 | 1/1978 | Wason et al. | 106/288 B |
| 4,076,549 | 2/1978 | Wason | 106/288 B |
| 4,216,113 | 8/1980 | Winyall | 252/317 |
| 4,231,893 | 11/1980 | Woodhead | 252/313 R |
| 4,251,281 | 2/1981 | Machurat et al. | 106/288 B |
| 4,340,583 | 7/1982 | Wason | 424/52 |
| 4,356,106 | 10/1982 | Woodhead et al. | 252/313 R |
| 4,508,607 | 4/1985 | Winyall | 204/180 P |
| 4,562,066 | 12/1985 | Hayes et al. | 424/52 |
| 4,676,964 | 1/1987 | Seki et al. | 423/335 |
| 4,699,732 | 10/1987 | Woodhead | 252/314 |
| 4,704,374 | 11/1987 | Jacques | 502/8 |
| 4,704,425 | 11/1987 | Lagarde et al. | 524/492 |
| 4,708,859 | 11/1987 | Chevallier | 423/339 |
| 4,738,838 | 4/1988 | Shinpo et al. | 423/339 |
| 4,778,667 | 10/1988 | Garvey et al. | 423/335 |
| 4,842,838 | 1/1989 | Chevallier | 423/339 |
| 4,973,462 | 11/1990 | Akira et al. | 423/339 |
| 5,009,874 | 4/1991 | Parmentier et al. | 423/335 |
| 5,021,192 | 6/1991 | David et al. | 252/313.1 |
| 5,089,554 | 2/1992 | Bomo et al. | 524/493 |
| 5,094,829 | 3/1992 | Krivak et al. | 423/339 |
| 5,124,143 | 6/1992 | Mühlemann et al. | 424/49 |
| 5,132,048 | 7/1992 | Picard-Seon et al. | 252/313.1 |
| 5,231,066 | 7/1993 | Reckers et al. | 502/239 |
| 5,236,623 | 8/1993 | Chevallier | 252/313.2 |
| 5,342,598 | 8/1994 | Persello | 423/339 |
| 5,376,305 | 12/1994 | Chane-Ching et al. | 252/313.1 |
| 5,395,605 | 3/1995 | Billion et al. | 423/339 |
| 5,403,570 | 4/1995 | Chevallier et al. | 423/339 |
| 5,412,018 | 5/1995 | Krivak et al. | 524/492 |
| 5,418,273 | 5/1995 | Dromard et al. | 524/437 |
| 5,484,581 | 1/1996 | Esch et al. | 423/335 |
| 5,512,271 | 4/1996 | McKeown et al. | 424/49 |
| 5,547,502 | 8/1996 | Chevallier et al. | 106/287.1 |
| 5,587,416 | 12/1996 | Chevallier et al. | 524/492 |
| 5,800,608 | 9/1998 | Bomal et al. | 106/492 |

FOREIGN PATENT DOCUMENTS

| | | |
|---|---|---|
| 0 018866 A1 | 11/1980 | European Pat. Off. |
| 0139754 A1 | 5/1985 | European Pat. Off. |
| 0 186313 A3 | 7/1986 | European Pat. Off. |
| 0 206906 A3 | 12/1986 | European Pat. Off. |
| 239479 A3 | 9/1987 | European Pat. Off. |
| 0 249524 A1 | 12/1987 | European Pat. Off. |
| 0 316205 A1 | 5/1989 | European Pat. Off. |
| 0335538 A2 | 10/1989 | European Pat. Off. |
| 0 396 450 A1 | 11/1990 | European Pat. Off. |
| 0 407 262 A1 | 1/1991 | European Pat. Off. |
| 0520862 | 12/1992 | European Pat. Off. |
| 1 054 175 | 2/1954 | France . |
| 1 072520 | 9/1954 | France . |
| 2353486 | 12/1977 | France . |
| 2 652805 | 4/1991 | France . |
| 710015 | 6/1954 | United Kingdom . |
| 719918 | 12/1954 | United Kingdom . |

OTHER PUBLICATIONS

Weiser, H.B. *The Hydrous Oxides*, First Edition, McGraw–Hill Book Co., Inc. NY (1926) pp. 254–258 [QD549W4.] No month.

Chem. Abst. vol. 106, No. 18, p. 128, Reference No. 140518, p. 128, May 4, 1987.

"Perry's Chemical Engineers' Handbook", Green & Maloney, $6^{th}$ Edition, pp. 18.1–18.3, 18.50, McGraw Hill, NY, NY (1984) No month.

Wason S.K., "Cosmetic Properties and Structure of Fine–Particle Synthetic Precipitated Silicas", *J. Soc. Cosmet.* Chem. Dec. 1977 vol. 29 pp. 497–521.

*Primary Examiner*—Gary P. Straub
*Assistant Examiner*—Timothy C. Vanoy
*Attorney, Agent, or Firm*—Burns, Doane, Swecker & Mathis, L.L.P.

[57] ABSTRACT

Novel silicas in the form of powder and spherical beads or granules. The silicas are characterized by having a specific CTAB surface of 100–140 $m^2/g$, a small median diameter, following disaggregation by ultrasound means, and optionally, a porous distribution so that the porous volume occupied by the pores whose diameter is 175–275 Å is less than 55% of the porous volume occupied by the pores having diameters of 400 Å or less. The invention also concerns a method for the preparation of said silicas and their use as reinforcing fillers for elastomers.

3 Claims, No Drawings

PRECIPITATED SILICAS

This application is a continuation of application Ser. No. 08/446,796, filed Aug. 21, 1995, now abandoned, which was a national phase application of PCT/FR94/01144, filed Sep. 29, 1994.

FIELD OF THE INVENTION

The present invention relates to new precipitated silicas which are in particular in the form of powder, of substantially spherical beads or of granules, to a process for their preparation and to their use as reinforcing filler for elastomers.

BACKGROUND OF THE INVENTION

It is known that precipitated silica has been employed for a long time as a white reinforcing filler in elastomers, in particular in tires.

However, like any reinforcing filler it should be capable of, on the one hand, being handled and, on the other hand and above all, being easily incorporated into mixtures.

It is known, in general, that, to obtain the optimum reinforcing properties imparted by a filler, the latter must be present in the elastomeric matrix in a final form which is at the same time divided as finely as possible and distributed as homogeneously as possible. Now, such conditions can be achieved only insofar as, on the one hand, the filler has a very good capacity for being incorporated into the matrix when mixed with the elastomer (incorporability of the filler) and for being broken up or disintegrated into the form of a very fine powder (disintegration of the filler) and insofar as, on the other hand, the powder resulting from the abovementioned disintegration process can, in its turn, be completely and homogeneously dispersed in the elastomer (dispersion of the powder).

In addition, for mutual affinity reasons, silica particles have an unfortunate tendency to agglomerate together in the elastomer matrix. A detrimental consequence of these silica/silica interactions is that they limit the reinforcing properties to a level which is appreciably lower than that which it would be theoretically possible to reach if all the silica/elastomer interactions capable of being created during the mixing operation were actually obtained (this theoretical number of silica/elastomer interaction being, as is well known, directly proportional to the external surface of the silica employed).

Furthermore, such silica/silica interactions tend, in the raw state, to increase the stiffness and the consistency of the mixtures, thus making them more difficult to process.

The problem which arises is to have available fillers which, while capable of being of a relatively large size, have a very good dispersibility in the elastomers.

SUMMARY AND OBJECTS OF THE INVENTION

The objective of the present invention is to circumvent the abovementioned disadvantages and to solve the abovementioned problem.

More precisely, the invention relates to new precipitated silicas which are generally in the form of powder, of substantially spherical beads or, optionally, of granules, and which, while being capable of being relatively large in size, have a dispersibility (and disintegrability) and reinforcing properties which are very satisfactory.

It also has the objective of providing a process for the preparation of these precipitated silicas.

Finally, it relates to the use of the said precipitated silicas as a reinforcing filler for elastomers, to which they impart very good mechanical properties.

The main subject of the invention consists of new precipitated silicas which have a dispersibility (and disintegrability) and reinforcing properties which are very satisfactory, the said silicas preferably being of a relatively large size.

DETAILED DESCRIPTION OF THE INVENTION

In the description which follows, the BET specific surface is determined according to the Brunauer-Emmet-Teller method described in "The Journal of the American Chemical Society", Vol. 60, page 309, February 1938 and corresponding to NFT standard 45007 (November 1987).

The CTAB specific surface is the external surface determined according to NFT standard 45007 (November 1987) (5.12).

The DOP oil uptake is determined according to NFT standard 30-022 (March 1953) using dioctyl phthalate.

The packing density in the tamped state (TPD) is measured according to NFT standard 030100.

Finally, it is specified that the pore volumes given are measured by mercury porosimetry, the pore diameters being calculated by the Washburn relationship with an angle of contact theta equal to 130° and a surface tension gamma equal to 484 dynes/cm (Micromeritics 9300 porosimeter).

The dispersibility and the disintegrability of the silicas according to the invention can be quantified by means of a specific test for disintegration.

The disintegration test is carried out according to the following method:

the cohesion of the agglomerates is assessed by a particle size measurement (using laser scattering) performed on a suspension of silica disintegrated ultrasonically beforehand; the disintegrability of the silica is thus measured (rupture of the objects from 0.1 to a few tens of microns). The ultrasonic disintegration is performed with the aid of a Vibracell Bioblock (600 W) sound generator equipped with a probe of 19 mm diameter. The particle size measurement is performed by laser scattering on a Sympatec particle size analyser.

2 grams of silica are weighed into a pill container (height: 6 cm and diameter: 4 cm) and are made up to 50 grams by adding demineralized water; an aqueous suspension containing 4% of silica is thus produced, which is homogenized for 2 minutes by magnetic stirring. Ultrasonic disintegration is then carried out as follows: with the probe immersed over a length of 4 cm, the output power is adjusted so as to obtain a needle displacement on the power scale indicating 20% (which corresponds to an energy dissipated by the end of the probe of 120 watts/cm$^2$). The disintegration is performed for 420 seconds. The particle size measurement is then carried out after a known volume (expressed in ml) of the homogenized suspension has been introduced into the cell of the particle size analyser.

The value of the median diameter $\emptyset_{50}$ which is obtained is proportionally lower the higher the disintegrability exhibited by the silica. The ratio (10×volume of suspension introduced (in ml))/optical density of the suspension detected by the particle size analyser is also determined (this optical density is of the order of 20). This ratio gives an indication of the fines content, that is to say of the content of particles smaller than 0.1 μm, which are not detected by the particle size analyser. This ratio, called the ultrasonic disintegration factor ($F_D$) is proportionally higher the higher the disintegrability exhibited by the silica.

According to a first embodiment of the invention, a new precipitated silica is now proposed, characterized in that it has:

- a CTAB specific surface ($S_{CTAB}$) of between 100 and 140 m²/g, preferably between 100 and 135 m²/g,
- a median diameter ($\emptyset_{50}$), after ultrasonic disintegration, smaller than 2.8 μm, preferably smaller than 2.7 μm, for example smaller than 2.5 μm.

The silica according to the first embodiment of the invention generally exhibits an ultrasonic disintegration factor ($F_D$) higher than 3 ml, preferably higher than 4 ml, for example higher than 4.5 ml.

A second embodiment of the invention consists of a new precipitated silica characterized in that it has:

- a CTAB specific surface ($S_{CTAB}$) of between 100 and 140 m²/g, preferably between 100 and 135 m²/g,
- a pore distribution such that the pore volume consisting of the pores whose diameter is between 175 and 275 Å represents less than 55% of the pore volume consisting of the pores of diameters smaller than or equal to 400 Å,
- a median diameter ($\emptyset_{50}$), after ultrasonic disintegration, smaller than 4.5 μm, preferably smaller than 4 μm, for example smaller than 3.8 μm.

One of the characteristics of the silica according to the second embodiment of the invention consists therefore also of the distribution, or spread, of the pore volume, and more particularly of the distribution of the pore volume which is produced by the pores of diameters smaller than or equal to 400 Å. This latter volume corresponds to the usable pore volume of the fillers which are employed for reinforcing elastomers. Analysis of the porograms shows that the silicas according to the second embodiment of the invention are such that less than 55%, preferably less than 50%, in particular less than 40% and, in some cases, less than 30% of the said usable pore volume consists of pores whose diameter is in the range from 175 to 275 Å.

In general, the silicas according to the second embodiment of the invention have an ultrasonic disintegration factor ($F_D$) higher than 3.0 ml, for example higher than 3.9 ml.

The silicas according to the invention also generally have a BET specific surface ($S_{BET}$) of between 100 and 210 m²/g, in particular between 100 and 180 m²/g.

According to an alternative form of the invention, the silicas have an $S_{BET}/S_{CTAB}$ ratio of between 1.0 and 1.2, that is to say that the silicas exhibit a low microporosity.

According to another alternative form of the invention the silicas exhibit an $S_{BET}/S_{CTAB}$ ratio higher than 1.2, for example between 1.21 and 1.4, that is to say that the silicas exhibit a relatively high microporosity.

The silicas according to the invention have a DOP oil uptake which is generally between 150 and 400 ml/100 g, more particularly between 180 and 350 ml/100 g, for example between 200 and 310 ml/100 g.

The silicas according to the invention may be in the form of powder, of substantially spherical beads or, optionally, of granules, and are especially characterized by the fact that, while being relatively large in size, they have a disintegrability and dispersibility which is quite remarkable and good reinforcing properties. They thus have a disintegrability and dispersibility that are advantageously superior, at identical or similar specific surface and at identical or similar size, to those of the silicas of the prior art.

The silica powders according to the invention preferably have a mean size greater than 15 μm, in particular between 20 and 150 μm, for example between 30 and 100 μm.

The packing density in the tamped state (TPD) of the said powders is generally at least 0.17 and, for example, between 0.2 and 0.3.

The said powders generally have a total pore volume of at least 2.5 cm³/g and, more particularly, between 3 and 5 cm³/g.

They make it possible to obtain a very good compromise between processing and final mechanical properties in the vulcanized state.

Finally, they constitute preferred precursors for the synthesis of granulates as described below.

The substantially spherical beads according to the invention preferably have a mean size of at least 80 μm.

According to some alternative forms of the invention this mean bead size is at least 100 μm, for example at least 150 μm; it generally does not exceed 300 μm and preferably lies between 100 and 270 μm. This mean size is determined according to NF standard X11507 (December 1970) by dry screening and determination of the diameter corresponding to a cumulative oversize of 50%.

The packing density in the tamped state (TPD) of the said beads is generally at least 0.17 and, for example, between 0.2 and 0.32.

They generally have a total pore volume of at least 2.5 cm³/g and more particularly between 3 and 5 cm³/g.

As indicated above, such a silica in the form of substantially spherical beads, which are advantageously solid and homogeneous forming little dust and with good pourability, exhibits a good disintegrability and dispersibility. In addition, it exhibits good reinforcing properties. Such a silica also constitutes a preferred precursor for the synthesis of the powders and granulates according to the invention.

These beads are preferably in accordance with the second embodiment of the invention; they then advantageously have a mean diameter ($\emptyset_{50}$), after ultrasonic disintegration, smaller than 3 μm, and an ultrasonic disintegration factor ($F_D$) higher than 8 ml, for example higher than 12 ml.

The dimensions of the granules according to the invention are preferably at least 1 mm, in particular between 1 and 10 mm, along their largest axis (length).

The said granules may be in forms of the greatest variety. By way of example it is possible to mention especially spherical, cylindrical, parallelepipedal, tablet, platelet and pellet forms and those of extrudate with a circular or polylobar section.

The packing density in the tamped state (TPD) of the said granulates is generally at least 0.27 and may range up to 0.37.

They generally have a total pore volume of at least 1 cm³/g and, more particularly, between 1.5 and 2 cm³/g.

The silicas according to the invention are preferably prepared by a process of the type including the reaction of a silicate of an alkali metal M with an acidifying agent, whereby a suspension of precipitated silica is obtained, and then the separation and the drying of this suspension, the said process being characterized in that the precipitation is carried out in the following manner:

(i) an initial stock is formed comprising a part of the total quantity of the silicate of an alkali metal M involved in the reaction, the silicate concentration, expressed as $SiO_2$, in the said stock being lower than 20 g/l, (ii) the acidifying agent is added to the said initial stock until at least 5% of the quantity of $M_2O$ present in the said initial stock is neutralized;

(iii) acidifying agent is added to the reaction mixture simultaneously with the remaining quantity of alkali metal silicate such that the consolidation ratio, that is to say the ratio of quantity of silicate added (expressed as $SiO_2$)/quantity of silicate present in the initial stock (expressed as $SiO_2$) is between 12 and 100.

It has thus been found that a very low concentration of silicate, expressed as $SiO_2$, in the initial stock, and an appropriate consolidation ratio during the simultaneous addition stage constituted important conditions for imparting excellent properties to the products obtained.

It should be noted, in general, that the process involved is a process for the synthesis of precipitated silica, that is to say that an acidifying agent is reacted with a silicate of an alkali metal M.

The choice of the acidifying agent and of the silicate is made in a manner which is well known per se. It may be recalled that the acidifying agent employed is generally a strong inorganic acid such as sulphuric acid, nitric acid or hydrochloric acid, or an organic acid, such as acetic acid, formic acid or carbonic acid.

Furthermore, any common form of silicates may be employed as silicate, such as metasilicates, disilicates and advantageously a silicate of an alkali metal M in which M is sodium or potassium.

In general, sulphuric acid is employed as acidifying agent and sodium silicate as silicate.

In the case where sodium silicate is employed, the latter generally has a molar ratio $SiO_2/Na_2O$ of between 2 and 4, more particularly between 3.0 and 3.7.

Insofar as the preferred process for the preparation of silicas of the invention is more particularly concerned, the precipitation is carried out specifically according to the following stages.

A stock which includes silicate is formed first of all. The quantity of silicate present in this initial stock advantageously represents only a part of the total quantity of silicate involved in the reaction.

According to an essential characteristic of the process of preparation according to the invention, the concentration of silicate in the initial stock is lower than 20 g of $SiO_2$ per liter. This concentration preferably does not exceed 11 g/l and, optionally, 8 g/l.

The conditions imposed on the silicate concentration in the initial stock partially determine the characteristics of the silicas obtained.

The initial stock may include an electrolyte. Nevertheless, preferably, no electrolyte is employed during the process of preparation according to the invention; in particular, the initial stock preferably does not include any electrolyte.

The term electrolyte is here intended to be understood in its normal accepted meaning, that is to say that it means any ionic or molecular substance which, when dissolved, decomposes or dissociates to form charged ions or particles. It is possible to mention as electrolyte a salt of the group of the salts of alkali and alkaline-earth metals, especially the salt of the metal of starting silicate and of the acidifying agent, for example sodium sulphate in the case of the reaction of a sodium silicate with sulphuric acid.

The second stage consists in adding the acidifying agent to the stock of the composition described above.

Thus, in this second stage the acidifying agent is added to the said initial stock until at least 5%, preferably at least 50%, of the quantity of $M_2O$ present in the said initial stock is neutralized.

In this second stage the acidifying agent is added to the said initial stock preferably until 50 to 99% of the quantity of $M_2O$ present in the said initial stock is neutralized.

The acidifying agent may be dilute or concentrated; its normality may be between 0.4 and 36N, for example between 0.6 and 1.5N.

In particular, in the case where the acidifying agent is sulphuric acid, its concentration is preferably between 40 and 180 g/l, for example between 60 and 130 g/l.

Once the desired value of the quantity of neutralized $M_2O$ is reached, a simultaneous addition is then carried out (stage (iii)) of acidifying agent and of a quantity of silicate of an alkali metal M such that the consolidation ratio, that is to say the ratio of quantity of silica added/quantity of silica present in the initial stock is between 12 and 100, preferably between 12 and 50, in particular between 13 and 40.

Throughout the stage (iii) the added quantity of acidifying agent is preferably such that 80 to 99%, for example 85 to 97%, of the added quantity of $M_2O$ is neutralized.

In stage (iii) it is possible to perform the simultaneous addition of acidifying agent and of silicate at a first pH plateau of the reaction mixture, $pH_1$, and then at a second pH plateau of the reaction mixture, $pH_2$, such that $7<pH_2<pH_1<9$.

The acidifying agent employed during stage (iii) may be dilute or concentrated; its normality may be between 0.4 and 36N, for example between 0.6 and 1.5N.

In particular, in the case where this acidifying agent is sulphuric acid, its concentration is preferably between 40 and 180 g/l, for example between 60 and 130 g/l.

The silicate of an alkali metal M added during stage (iii) is generally in a concentration, expressed as silica, of between 40 and 330 g/l, for example between 60 and 250 g/l.

The actual precipitation reaction is ended when all the remaining quantity of silicate has been added.

It is advantageous to perform an aging of the reaction mixture, especially after the abovementioned simultaneous addition, it being possible for this aging to last, for example, from 1 to 60 minutes, in particular from 5 to 30 minutes.

Finally, it is desirable, after the precipitation, in a subsequent stage, especially before the optional aging, to add an additional quantity of acidifying agent to the reaction mixture. This addition is generally made until a pH value of the reaction mixture of between 3 and 6.5, preferably between 4 and 5.5, is obtained. It also makes it possible to neutralize the whole quantity of $M_2O$ added during stage (iii) and to adjust the pH of the final silica to the desired value for a given application.

The acidifying agent employed during this addition is generally identical with that employed during stage (iii) of the process of preparation according to the invention.

The temperature of the reaction mixture is generally between 60° and 98° C.

The addition of acidifying agent during stage (ii) is preferably performed in an initial stock whose temperature is between 60° and 96° C.

According to an alternative form of the invention the reaction is performed at a constant temperature of between 75° and 96° C. According to another alternative form of the invention the temperature at the end of reaction is higher than the temperature at the beginning of reaction: the temperature at the beginning of the reaction is thus preferably maintained between 70° and 96° C. and the temperature is then increased during reaction over a few minutes, preferably up to a value of between 80° and 98° C., at which value it is maintained until the end of the reaction.

At the end of the operations which have just been described a silica slurry is obtained which is then separated (liquid/solid separation). This separation generally consists of a filtration followed, if need be, by washing. The filtration may be carried out by any suitable method, for example using a filter press or a belt filter or a rotary vacuum filter.

The precipitated silica suspension thus recovered (filter cake) is then dried.

This drying may be carried out by any means known per se.

The drying is preferably effected by spraying.

Any suitable type of sprayer may be employed for this purpose, especially turbine-, nozzle-, liquid pressure- or two fluid-sprayers.

According to an alternative form of the process of preparation, the suspension to be dried has a solids content higher than 18% by weight, preferably higher than 20% by weight. The drying is then generally performed by means of a turbine- or preferably nozzle-sprayer.

The precipitated silica capable of being obtained according to this alternative form of the process is generally in the form of substantially spherical beads, preferably with a mean size of at least 80 $\mu$m.

This solids content can be obtained directly at filtration by employing a suitable filter which gives a filter cake with the right content. Another method consists, after the filtration, in a subsequent stage of the process, in adding dry material to the cake, for example silica in powder form, so as to obtain the necessary content.

It should be noted that, as is well known, the cake thus obtained is generally not in a condition that permits spraying, especially because of its excessively high viscosity.

The cake is then subjected, in a manner known per se, to a crumbling operation. This operation may be carried out by passing the cake through a mill of the colloidal or bead type. Moreover, to lower the viscosity of the suspension to be sprayed, aluminium may be added, especially in the form of sodium aluminate, during the process as described in patent application FR-A-2,536,380, the teaching of which is incorporated here. This addition may be carried out in particular at the actual time of crumbling.

At the end of the drying a milling stage may be carried out on the recovered product, especially on the product obtained by drying the suspension which has a solids content higher than 18% by weight. The precipitated silica which is then capable of being obtained is generally in the form of a powder preferably with a mean size of at least 15 $\mu$m, in particular between 20 and 150 $\mu$m, for example between 30 and 100 $\mu$m.

The products ground to the desired particle size may be separated from any nonconforming products by means, for example, of vibrating screens of appropriate mesh sizes, and the nonconforming products thus recovered may be recycled to the grinding stage.

Similarly, according to another alternative form of the process of preparation, the suspension to be dried has a solids content lower than 18% by weight. The drying is then generally performed by means of a turbine- or nozzle-sprayer. The precipitated silica which is then capable of being obtained according to this alternative form of the invention is generally in the form of a powder, preferably with a mean size of at least 15 $\mu$m, in particular between 20 and 150 $\mu$m, for example between 30 and 100 $\mu$m.

A crumbling operation may also be carried out here.

Finally, the product which has been dried (especially from a suspension which has a solids content lower than 18% by weight) or ground may, according to another alternative form of the process of the invention, be subjected to an agglomeration stage.

Agglomeration is here intended to mean any process which makes it possible to bind together finely divided objects in order to bring them into the form of objects which are of larger size and mechanically resistant.

These processes are especially direct compression, wet-route granulation (that is to say with the use of a binder such as water, silica slurry etc.), extrusion and, preferably, dry compacting.

When this last technique is used, it may be found advantageous, before undertaking the compacting, to deaerate (an operation also called predensification or degasing) the pulverulent products so as to eliminate the air included in the latter and to ensure more uniform compacting.

The precipitated silica capable of being obtained according to this alternative form of the process is advantageously in the form of granules, preferably at least 1 mm in size, in particular between 1 and 10 mm.

At the end of the agglomeration stage the products may be calibrated to a desired size, for example by screening, and then packaged for their future use.

The powders, and the beads, of precipitated silica obtained by the process of the invention thus offer the advantage, inter alia, of simply, efficaciously and economically providing access to granules such as the abovementioned, especially by conventional forming operations such as, for example, a granulation or a compacting, without these giving rise to damage capable of masking, or even annihilating, the intrinsic reinforcing properties attached to these powders, as may be the case in the prior art when conventional powders are being used.

The silicas according to the invention find a particularly advantageous application in the reinforcement of natural or synthetic elastomers, and especially of tires. They impart to these elastomers a significant improvement in their mechanical properties, such as elongation at break and breaking and tear strength, while providing them with very satisfactory rheological properties.

The following examples illustrate the invention without, however, limiting its scope.

EXAMPLE 1

662 liters of a sodium silicate solution (with a molar ratio $SiO_2/Na_2O$ equal to 3.4) which has a concentration, expressed as silica, of 10 g/l are introduced into a stainless steel reactor fitted with a stirring system using propellers and with a heating using a jacket.

The silicate concentration, expressed as $SiO_2$, in the initial stock is therefore 10 g/l. The solution is then heated to a temperature of 85° C. while being kept stirred. The whole reaction is performed at 85° C. A solution of sulphuric acid, in a concentration of 80 g/l is then introduced, over 3 min 20 s, at a rate of 10.2 l/min; at the end of this addition the degree of neutralization of the stock is 85%, that is to say that 85% of the quantity of $Na_2O$ present in the initial stock is neutralized.

The following are then introduced simultaneously, over 70 min, into the reaction mixture:

a solution of sulphuric acid in a concentration of 80 g/l, at a rate of 10.2 l/min, and a solution of sodium silicate in a concentration, expressed as silica, of 130 g/l, at a rate of 14.2 l/min.

During this simultaneous addition the instantaneous degree of neutralization is 92%, that is to say that 92% of the quantity of $Na_2O$ added (per min) is neutralized.

At the end of this simultaneous addition the consolidation ratio is 19.5.

After all the silicate has been introduced, the introduction of the sulphuric acid solution is continued at the same rate, this being for 10 min. This additional introduction of acid then brings the pH of the reaction mixture to a value of 4.5.

A precipitated silica slurry is thus obtained, which is filtered and washed by means of a rotary vacuum filter so that a silica cake is finally recovered whose loss on ignition is 87% (and therefore a solids content of 13% by weight).

This cake is then fluidized merely by mechanical action. After this crumbling operation the resulting slurry is sprayed by means of a turbine sprayer.

The characteristics of silica P1 in powder form (in accordance with the invention) are then the following:

| | |
|---|---|
| CTAB specific surface | 125 m$^2$/g |
| BET specific surface | 164 m$^2$/g |
| pore volume V1 represented by the pores of d ≦ 400 Å | 0.58 cm$^3$/g |
| pore volume V2 represented by the pores 175 Å ≦ d ≦ 275 Å | 0.14 cm$^3$/g |
| V2/V1 ratio | 24% |
| mean particle size | 60 μm |

Silica P1 is subjected to the disintegration test as defined above in the description.

After ultrasonic disintegration it has a median diameter ($\varnothing_{50}$) of 2.35 μm and an ultrasonic disintegration factor ($F_D$) of 5.2 ml.

EXAMPLE 2

The procedure is as in Example 1, except at the simultaneous addition of the sulphuric acid and sodium silicate solutions. Thus:

662 liters of a sodium silicate solution (with a molar ratio SiO$_2$/Na$_2$O equal to 3.4) with a concentration, expressed as silica, of 10 g/l are introduced into a stainless steel reactor fitted with a stirring system using propellers and with heating using a jacket.

The silicate concentration, expressed as SiO$_2$, in the initial stock is therefore 10 g/l. The solution is then heated to a temperature of 85° C. while being kept stirred. The whole reaction is performed at 85° C. A solution of sulphuric acid, in a concentration of 80 g/l is then introduced, over 3 min 20 s, at a rate of 10.2 l/min; at the end of this addition the degree of neutralization of the stock is 85%, that is to say that 85% of the quantity of Na$_2$O present in the initial stock is neutralized.

The following are then introduced simultaneously, over 70 min, into the reaction mixture:

a solution of sulphuric acid in a concentration of 80 g/l, at a rate of 10.2 l/min, and a solution of sodium silicate in a concentration, expressed as silica, of 230 g/l, at a rate of 7.9 l/min.

During this simultaneous addition the instantaneous degree of neutralization is 93%, that is to say that 93% of the quantity of Na$_2$O added (per min) is neutralized.

At the end of this simultaneous addition the consolidation ratio is 19.2.

After all the silicate has been introduced, the introduction of the sulphuric acid solution is continued at the same rate, this being for 10 min. This additional introduction of acid then brings the pH of the reaction mixture to a value of 4.5.

A precipitated silica slurry is thus obtained, which is filtered and washed by means of a rotary vacuum filter so that a silica cake is finally recovered whose loss on ignition is 87.1% (and therefore a solids content of 12.9% by weight).

This cake is then fluidized merely by mechanical action. After this crumbling operation the resulting slurry is sprayed by means of a turbine-sprayer.

The characteristics of silica P2 in powder form (in accordance with the invention) are then the following:

| | |
|---|---|
| CTAB specific surface | 100 m$^2$/g |
| BET specific surface | 138 m$^2$/g |
| pore volume V1 represented by the pores of d ≦ 400 Å | 0.26 cm$^3$/g |
| pore volume V2 represented by the pores 175 Å ≦ d ≦ 275 Å | 0.07 cm$^3$/g |
| V2/V1 ratio | 27% |
| mean particle size | 60 μm |

Silica P2 is subjected to the disintegration test as defined above in the description.

After ultrasonic disintegration it has a median diameter ($\varnothing_{50}$) of 3.6 μm and an ultrasonic disintegration factor ($F_D$) of 3.5 ml.

EXAMPLE 3

662 liters of a sodium silicate solution (with a molar ratio SiO$_2$/Na$_2$O equal to 3.4) with a concentration, expressed as silica, of 5 g/l are introduced into a stainless steel reactor fitted with a stirring system using propellers and with heating using a jacket.

The silicate concentration, expressed as SiO$_2$, in the initial stock is therefore 5 g/l. The solution is then heated to a temperature of 85° C. while being kept stirred. The whole reaction is performed at 85° C. A solution of sulphuric acid, in a concentration of 80 g/l is then introduced, over 1 min 40 s, at a rate of 10.2 l/min; at the end of this addition the degree of neutralization of the stock is 85%, that is to say that 85% of the quantity of Na$_2$O present in the initial stock is neutralized.

The following are then introduced simultaneously, over 70 min, into the reaction mixture:

a solution of sulphuric acid in a concentration of 80 g/l, at a rate of 10.2 l/min, and a solution of sodium silicate in a concentration, expressed as silica, of 130 g/l, at a rate of 14.2 l/min.

During this simultaneous addition the instantaneous degree of neutralization is 92%, that is to say that 92% of the quantity of Na$_2$O added (per min) is neutralized.

At the end of this simultaneous addition the consolidation ratio is 39.0.

After all the silicate has been introduced, the introduction of the sulphuric acid solution is continued at the same rate, this being for 10 min. This additional introduction of acid then brings the pH of the reaction mixture to a value of 4.5.

A precipitated silica slurry is thus obtained, which is filtered and washed by means of a rotary vacuum filter so that a silica cake is finally recovered whose loss on ignition is 87% (and therefore a solids content of 13% by weight).

This cake is then fluidized merely by mechanical action. After this crumbling operation the resulting slurry is sprayed by means of a turbine-sprayer.

The characteristics of silica P3 in powder form (in accordance with the invention) are then the following:

| | |
|---|---|
| CTAB specific surface | 119 m$^2$/g |
| BET specific surface | 137 m$^2$/g |
| pore volume V1 represented by the pores of d ≦ 400 Å | 0.38 cm$^3$/g |
| pore volume V2 represented by the pores 175 Å ≦ d ≦ 275 Å | 0.10 cm$^3$/g |
| V2/V1 ratio | 26% |
| mean particle size | 60 μm |

Silica P3 is subjected to the disintegration test as defined above in the description.

After ultrasonic disintegration it has a median diameter ($\phi_{50}$) of 2.3 μm and an ultrasonic disintegration factor ($F_D$) of 5.0 ml.

EXAMPLE 4

662 liters of a sodium silicate solution (with a molar ratio $SiO_2/Na_2O$ equal to 3.4) with a concentration, expressed as silica, of 10 g/l are introduced into a stainless steel reactor fitted with a stirring system using propellers and with heating using a jacket.

The silicate concentration, expressed as $SiO_2$, in the initial stock is therefore 10 g/l. The solution is then heated to a temperature of 85° C. while being kept stirred. A solution of sulphuric acid, in a concentration of 80 g/l is then introduced, over 3 min 20 s, at a rate of 10.2 l/min; the reaction mixture is kept at a temperature of 85° C. during the addition of the sulphuric acid solution; at the end of this addition the degree of neutralization of the stock is 85%, that is to say that 85% of the quantity of $Na_2O$ present in the initial stock is neutralized.

The following are then introduced simultaneously, over 70 min, into the reaction mixture:

a solution of sulphuric acid in a concentration of 80 g/l, at a rate of 9.9 l/min, and a solution of sodium silicate in a concentration, expressed as silica, of 130 g/l, at a rate of 14.2 l/min.

The temperature of the reaction mixture is kept at 85° C. during the first 50 minutes of the simultaneous addition; it is then raised from 85° to 90° C. over 5 min and then kept at 90° C. until the end of the reaction.

During this simultaneous addition the instantaneous degree of neutralization is 90%, that is to say that 90% of the quantity of $Na_2O$ added (per min) is neutralized.

At the end of this simultaneous addition the consolidation ratio is 19.5.

After all the silicate has been introduced, the introduction of the sulphuric acid solution is continued at the same rate, this being for 10 min. This additional introduction of acid then brings the pH of the reaction mixture to a value of 4.5.

The reaction mixture is then left to age for 10 min (with stirring at 90° C.).

A precipitated silica slurry is thus obtained, which is filtered and washed by means of a rotary vacuum filter so that a silica cake is finally recovered whose loss on ignition is 87% (and therefore a solids content of 13% by weight).

This cake is then fluidized merely by mechanical action. After this crumbling operation the resulting slurry is sprayed by means of a turbine-sprayer.

The characteristics of silica P4 in powder form (in accordance with the invention) are then the following:

| | |
|---|---|
| CTAB specific surface | 109 m²/g |
| BET specific surface | 136 m²/g |
| pore volume V1 represented by the pores of d ≦ 400 Å | 0.38 cm³/g |
| pore volume V2 represented by the pores 175 Å ≦ d ≦ 275 Å | 0.12 cm³/g |
| V2/V1 ratio | 32% |
| mean particle size | 60 μm |

Silica P4 is subjected to the disintegration test as defined above in the description.

After ultrasonic disintegration it has a median diameter ($\phi_{50}$) of 3.0 μm and an ultrasonic disintegration factor ($F_D$) of 4.0 ml.

EXAMPLE 5

The procedure is as in Example 4, except for the temperature of the reaction mixture. Thus:

662 liters of a sodium silicate solution (with a molar ratio $SiO_2/Na_2O$ equal to 3.4) with a concentration, expressed as silica, of 10 g/l are introduced into a stainless steel reactor fitted with a stirring system using propellers and with heating using a jacket.

The silicate concentration, expressed as $SiO_2$, in the initial stock is therefore 10 g/l. The solution is then heated to a temperature of 80° C. while being kept stirred. A solution of sulphuric acid, in a concentration of 80 g/l is then introduced, over 3 min 20 s, at a rate of 10.2 l/min; the reaction mixture is kept at a temperature of 80° C. during the addition of the sulphuric acid solution; at the end of this addition the degree of neutralization of the stock is 85%, that is to say that 85% of the quantity of $Na_2O$ present in the initial stock is neutralized.

The following are then introduced simultaneously, over 70 min, into the reaction mixture:

a solution of sulphuric acid in a concentration of 80 g/l, at a rate of 9.9 l/min, and a solution of sodium silicate in a concentration, expressed as silica, of 130 g/l, at a rate of 14.2 l/min.

The temperature of the reaction mixture is kept at 80° C. during the first 50 minutes of the simultaneous addition; it is then raised from 80° to 95° C. over 7 min and then kept at 95° C. until the end of the reaction.

During this simultaneous addition the instantaneous degree of neutralization is 90%, that is to say that 90% of the quantity of $Na_2O$ added (per min) is neutralized.

At the end of this simultaneous addition the consolidation ratio is 19.5.

After all the silicate has been introduced, the introduction of the sulphuric acid solution is continued at the same rate, this being for 10 min. This additional introduction of acid then brings the pH of the reaction mixture to a value of 4.5.

The reaction mixture is then left to age for 10 min (with stirring at 95° C.).

A precipitated silica slurry is thus obtained, which is filtered and washed by means of a rotary vacuum filter so that a silica cake is finally recovered whose loss on ignition is 87% (and therefore a solids content of 13% by weight).

This cake is then fluidized merely by mechanical action. After this crumbling operation the resulting slurry is sprayed by means of a turbine-sprayer.

The characteristics of silica P5 in powder form (in accordance with the invention) are then the following:

| | |
|---|---|
| CTAB specific surface | 118 m²/g |
| BET specific surface | 160 m²/g |
| pore volume V1 represented by the pores of d ≦ 400 Å | 0.48 cm³/g |
| pore volume V2 represented by the pores 175 Å ≦ d ≦ 275 Å | 0.11 cm³/g |
| V2/V1 ratio | 23% |
| mean particle size | 60 μm |

Silica P5 is subjected to the disintegration test as defined above in the description.

After ultrasonic disintegration it has a median diameter ($\phi_{50}$) of 2.6 μm and an ultrasonic disintegration factor ($F_D$) of 4.2 ml.

EXAMPLE 6

The following are introduced into a stainless steel reactor fitted with a stirring system using propellers and with heating using a jacket:

626 liters of water, and 36 liters of a sodium silicate solution (with a molar ratio $SiO_2/Na_2O$ equal to 3.6) with a concentration, expressed as silica, of 130 g/l.

The silicate concentration, expressed as $SiO_2$, in the initial stock is therefore 7.1 g/l. The solution is then heated to a temperature of 95° C. while being kept stirred. The whole reaction is performed at 95° C. A solution of sulphuric acid, in a concentration of 80 g/l is then introduced, over 3 min 20 s, at a rate of 5.4 l/min; at the end of this addition the degree of neutralization of the stock is 67%, that is to say that 67% of the quantity of $Na_2O$ present in the initial stock is neutralized.

The following are then introduced simultaneously, over 70 min, into the reaction mixture:

a solution of sulphuric acid in a concentration of 80 g/l, at a rate of 5.4 l/min, and a solution of sodium silicate in a concentration, expressed as silica, of 130 g/l, at a rate of 8.8 l/min.

During this simultaneous addition the instantaneous degree of neutralization is 83%, that is to say that 83% of the quantity of $Na_2O$ added (per min) is neutralized.

At the end of this simultaneous addition the consolidation ratio is 17.1.

After all the silicate has been introduced, the introduction of the sulphuric acid solution is continued at the same rate, this being for 10 min. This additional introduction of acid then brings the pH of the reaction mixture to a value of 4.5.

The reaction mixture is then left to age for 10 min (with stirring at 95° C.).

A precipitated silica slurry is thus obtained, which is filtered and washed by means of a filter press so that a silica cake is finally recovered whose loss on ignition is 78% (and therefore a solids content of 22% by weight).

This cake is then fluidized by mechanical and chemical action (addition of a quantity of sodium aluminate corresponding to an $Al/SiO_2$ weight ratio of 3000 ppm). After this crumbling operation a pumpable cake is obtained, with a pH of 6.7, which is then sprayed by means of a nozzle/sprayer.

The characteristics of silica P6 in the form of substantially spherical beads (in accordance with the invention) are then the following:

| CTAB specific surface | 131 m²/g |
|---|---|
| BET specific surface | 145 m²/g |
| pore volume V1 represented by the pores of d ≤ 400 Å | 0.84 cm³/g |
| pore volume V2 represented by the pores 175 Å ≤ d ≤ 275 Å | 0.40 cm³/g |
| V2/V1 ratio | 48% |
| mean bead size | 200 μm |

Silica P6 is subjected to the disintegration test as defined above in the description.

After ultrasonic disintegration it has a median diameter ($\phi_{50}$) of 3.7 μm and an ultrasonic disintegration factor ($F_D$) of 11.0 ml.

EXAMPLE 7

The following are introduced into a stainless steel reactor fitted with a stirring system using propellers and with heating using a jacket:

853 liters of water, 18.4 liters of a sodium silicate solution (with a molar ratio $SiO_2/Na_2O$ equal to 3.5) with a concentration, expressed as silica, of 237 g/l.

The silicate concentration, expressed as $SiO_2$, in the initial stock is therefore 5 g/l. The solution is then heated to a temperature of 85° C. while being kept stirred. The whole reaction is performed at 85° C. with stirring. Dilute sulphuric acid, with a relative density of 1.050 at 20° C. is then introduced, over 3 min 20 s, at a rate of 4.8 l/min; at the end of this addition the degree of neutralization of the stock is 91%, that is to say that 91% of the quantity of $Na_2O$ present in the initial stock is neutralized.

A sodium silicate solution of the type described above is then introduced, over 60 min, at a rate of 5.4 l/min, into the reaction mixture simultaneously with dilute sulphuric acid, also of the type described above, at a rate adjusted so as to maintain the pH in the reaction mixture:

at a value of 8.5±0.1 for the first 15 minutes, then at a value of 7.8±0.1 for the last 45 minutes.

During this simultaneous addition the instantaneous degree of neutralization is 92%, that is to say that 92% of the quantity of $Na_2O$ added (per min) is neutralized.

At the end of this simultaneous addition the consolidation ratio is equal to 17.5.

After this simultaneous addition the introduction of silicate is stopped and the dilute sulphuric acid continues to be introduced so as to lower the value of the pH of the reaction mixture to a value of 4.4 over 7 min.

The introduction of acid is then stopped and the reaction mixture is then kept stirred for 10 min at a temperature of 85° C.

A precipitated silica slurry is thus obtained, which is filtered and washed by means of a filter press so that a silica cake is finally recovered whose loss on ignition is 81% (and therefore a solids content of 19% by weight).

This cake is then fluidized by mechanical and chemical action (addition of a quantity of sodium aluminate corresponding to an $Al/SiO_2$ weight ratio of 2500 ppm and addition of sulphuric acid). After this crumbling operation a pumpable cake is obtained, with a pH of 6.5, which is then sprayed by means of a nozzle-sprayer.

The characteristics of silica P7 in the form of substantially spherical beads (in accordance with the invention) are then the following:

| CTAB specific surface | 123 m²/g |
|---|---|
| BET specific surface | 136 m²/g |
| pore volume V1 represented by the pores of d ≤ 400 Å | 0.77 cm³/g |
| pore volume V2 represented by the pores 175 Å ≤ d ≤ 275 Å | 0.21 cm³/g |
| V2/V1 ratio | 27% |
| mean bead size | 250 μm |

Silica P7 is subjected to the disintegration test as defined above in the description.

After ultrasonic disintegration it has a median diameter ($\phi_{50}$) of 2.9 μm and an ultrasonic disintegration factor ($F_D$) of 14.5 ml.

EXAMPLE 8

By way of comparison, three commercial silicas with a CTAB specific surface of between 100 and 140 m²/g, usable as reinforcing fillers for elastomers, have been studied. These were:

on the one hand, two silicas in powder form:

Perkasil KS® 300 powder (referred to as PC1 below), sold by Akzo,

Ultrasil VN2® powder (referred to as PC2 below), sold by Degussa, on the other hand, a silica in the form of substantially spherical beads, Zeosil® 125 MP silica (referred to as MP1 below), sold by Rhône-Poulenc Chimie.

The characteristics of these silicas are shown together in Table I below. This table also repeats, for comparison, the characteristics of silicas P1 to P7 according to the invention.

TABLE 1

|  | PC1 | PC2 | MP1 | P1 | P2 | P3 | P4 | P5 | P6 | P7 |
|---|---|---|---|---|---|---|---|---|---|---|
| $S_{CTAB}$ (m$^2$/g) | 126 | 132 | 125 | 125 | 100 | 119 | 109 | 118 | 131 | 123 |
| $S_{BET}$ (m$^2$/g) | 126 | 142 | 126 | 164 | 138 | 137 | 136 | 160 | 145 | 136 |
| V1 (cm$^3$/g) | 0.51 | 0.44 | 0.44 | 0.58 | 0.26 | 0.38 | 0.38 | 0.48 | 0.84 | 0.77 |
| V2 (cm$^3$/g) | 0.16 | 0.08 | 0.10 | 0.14 | 0.07 | 0.10 | 0.12 | 0.11 | 0.40 | 0.21 |
| V2/V1 (%) | 31 | 18 | 23 | 24 | 27 | 26 | 32 | 23 | 48 | 27 |
| Mean size (μm) | 11.5 | 17 | 275 | 60 | 60 | 60 | 60 | 60 | 200 | 250 |
| $\phi_{50}$ (μm) | 7.1 | 10.3 | 9.0 | 2.35 | 3.6 | 2.3 | 3.0 | 2.6 | 3.8 | 2.9 |
| $F_D$ (ml) | 2.8 | 2.4 | 2.2 | 5.2 | 3.5 | 5.0 | 4.0 | 4.2 | 11.0 | 14.5 |

EXAMPLE 9

This example illustrates the use and the behaviour of silicas according to the invention and of silicas of the prior art in an industrial rubber formulation.

The following formulation is employed (in parts by weight):

| | |
|---|---|
| SBR 1712 rubber[1] | 100 |
| Silica | 51 |
| Active ZnO[2] | 1.81 |
| Stearic acid | 0.35 |
| 6PPD[3] | 1.45 |
| CBS[4] | 1.3 |
| DPG[5] | 1.45 |
| Sulphur[6] | 1.1 |
| Silane X50S[7] | 8.13 |

(1) Type 1712 styrene butadiene copolymer
(2) Rubber grade zinc oxide
(3) N-(1,3-dimethylbutyl)-N'-phenyl-p-phenylenediamine
(4) N-cyclohexyl-2-benzothiazylsulphenamide
(5) Diphenylguanidine
(6) Vulcanizing agent
(7) Silica/rubber coupling agent (product marketed by Degussa)

The formulations are prepared as follows:

The following are introduced into an internal mixer (Banbury type), in this order and at the times and mixing temperatures shown in brackets:

SBR 1712 ($t_0$) (55° C.)

X50S and ⅔ of the silica ($t_0$+1 min) (90° C.)

ZnO, stearic acid, 6PPD and ⅓ of the silica ($t_0$+2 min) (110° C.)

The mixer is discharged (the mix dropped) when the chamber temperature reaches 165° C. (that is to say at approximately $t_0$+5 min). The mix is introduced onto a roll mill, the rolls being maintained at 30° C., to be calendered thereon. The CBS, the DPG and the sulphur are introduced onto this mill.

After homogenization and three ultimate passes, the final mixture is calendered into the form of sheets of 2.5 to 3 mm thickness.

The test results are as follows:

1—Rheological properties

The measurements are carried out on formulations in the raw state at 150° C.

The results are reported in Table II below. The apparatus employed for conducting the measurements has been shown.

TABLE II

|  | P1 | P4 | P5 | P6 | PC1 | PC2 | MP1 |
|---|---|---|---|---|---|---|---|
| Min. torque[1] | 22.6 | 21.1 | 22.8 | 18.9 | 28.9 | 23.2 | 31.2 |
| Max. torque[1] | 70.9 | 69.7 | 70.5 | 69.8 | 82.7 | 79.7 | 86.7 |

(1) Monsanto 100 S rheometer

The formulations obtained from silicas according to the invention produce the lowest values.

This reflects a greater processability of the mixtures produced from the silicas according to the invention, in particular in respect of the extrusion and calendering operations frequently carried out during the manufacture of tires (less energy expenditure for processing the mix, greater ease of injection during the mixing, less die swell during extrusion, less shrinkage on calendering, etc).

2—Mechanical properties

The measurements are carried out on vulcanized formulations.

The vulcanization is carried out by heating the formulations to 150° C. for 420 minutes.

The following standards were employed:

(I) tensile tests (100% modulus, breaking strength, elongation at break):
NFT 46-002 or ISO 37-1977

(II) tear strength tests
DIN 53-507

The results obtained are listed in Table III below.

TABLE III

|  | P1 | P4 | P5 | P6 | PC1 | PC2 | MP1 |
|---|---|---|---|---|---|---|---|
| 100% modulus (MPa) | 2.2 | 2.4 | 2.4 | 1.8 | 3.3 | 2.7 | 3.8 |
| Breaking strength (MPa) | 22.3 | 20.7 | 22.5 | 4.9 | 19.2 | 20.2 | 19.5 |
| Elongation at break (%) | 490 | 470 | 500 | 593 | 397 | 419 | 375 |
| Tear strength (kN/m) | 20.0 | 16.3 | 27.2 | 27.4 | 11.5 | 14.3 | 9.7 |

The above results clearly demonstrate the better reinforcing effect imparted by the silicas according to the invention when compared with silicas of the prior art, albeit of equivalent theoretical reinforcing power.

The silicas according to the invention result in the lowest 100% moduli, which proves a better dispersion of the silica.

The highest reinforcing power of the silicas according to the invention is confirmed especially by the higher values obtained for the breaking and tear strength and for the elongation at break.

We claim:

1. Precipitated silica having the following properties:

a CTAB specific surface ($S_{CTAB}$) of between 100 and 140 m$^2$/g, a pore distribution such that the pore volume consisting of the pores whose diameter is between 175 and 275 Å represents less than 50% of the pore volume consisting of the pores of diameters smaller than or equal to 400 Å, a median diameter ($\phi_{50}$), after ultrasonic disintegration, smaller than 4.5 μm, and the precipitated silica is in a form chosen from the group consisting of: a powder with an average size of at least 15 µm, substantially spherical beads with an average size of at least 80 µm, granules having a size of at least 1 mm, and any combination thereof.

2. Silica according to claim 1, wherein said silica has an ultrasonic disintegration factor ($F_D$) higher than 3.0 ml.

3. Silica according to claim 1, wherein said silica is in the form of substantially spherical beads and in that, after ultrasonic disintegration, it has a median diameter ($\emptyset_{50}$) smaller than 3.1 µm and an ultrasonic disintegration factor ($F_D$) higher than 8 ml.

* * * * *